United States Patent
AbuAli et al.

(10) Patent No.: US 8,527,223 B2
(45) Date of Patent: Sep. 3, 2013

(54) METHODS AND SYSTEMS FOR ENERGY PROGNOSIS

(75) Inventors: Mohamed AbuAli, Cincinnati, OH (US); Jay Lee, Mason, OH (US); Wenyu Zhao, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 331 days.

(21) Appl. No.: 12/879,439

(22) Filed: Sep. 10, 2010

(65) Prior Publication Data

US 2011/0066391 A1    Mar. 17, 2011

Related U.S. Application Data

(60) Provisional application No. 61/241,614, filed on Sep. 11, 2009.

(51) Int. Cl.
G01R 17/02 (2006.01)
G01R 21/00 (2006.01)
G01R 17/00 (2006.01)
G01R 17/06 (2006.01)

(52) U.S. Cl.
USPC .............. 702/61; 702/57; 702/60; 702/65

(58) Field of Classification Search
USPC ............. 702/60, 61, 62, 64, 179, 183, 186, 702/188; 340/657; 705/10
See application file for complete search history.

(56) References Cited

U.S. PATENT DOCUMENTS

| 8,094,034 B2 * | 1/2012 | Patel et al. ............ 340/657 |
| 8,183,995 B2 * | 5/2012 | Wang et al. ............ 340/539.1 |
| 2003/0061091 A1 * | 3/2003 | Amaratunga et al. ....... 705/10 |
| 2007/0276547 A1 | 11/2007 | Miller |
| 2008/0189567 A1 | 8/2008 | Goodnow et al. |
| 2008/0263469 A1 | 10/2008 | Nasle et al. |
| 2011/0046904 A1 * | 2/2011 | Souilmi ................ 702/62 |

OTHER PUBLICATIONS

Al-Ghanim, Amjed, "A Statistical Approach Linking Energy Management to Maintenance and Production Factors," Journal of Quality in Maintenance (2003): 1355-2511.

Ansett, M., et al., "Application of Neural Networking Models to Predict Energy Use," Ashrae Transactions: Research (1993): 505-517.

(Continued)

Primary Examiner — Michael Nghiem
Assistant Examiner — Felix Suarez
(74) Attorney, Agent, or Firm — Dinsmore & Shohl LLP

(57) ABSTRACT

In one embodiment, a method for managing an industrial process wherein a processor transforms electronic data into an energy prognosis is provided. An energy related test signal including effective power test data indicative of electrical energy consumed by an energy consuming machine may be received. The energy related test signal may be partitioned into an energy related test sub-signal. Mathematical functions may be applied to the energy related test sub-signal to extract a feature set of data from the energy related test sub-signal. The feature set of data may be transformed with a transformation matrix into a reduced test feature set. The reduced test feature set may be input into a performance assessment algorithm based at least in part upon a reduced training feature set derived from data indicative of electrical energy consumed during healthy operation. A power-based performance index may be generated with the performance assessment algorithm.

20 Claims, 10 Drawing Sheets

(56) References Cited

OTHER PUBLICATIONS

Aydinalp-Koksal, Merih, et al., "Comparison of Neural Network, Conditional Demand Analysis and Engineering Approaches of Modeling End-Use Energy Consumption in the Residential Sector," ScienceDirect, Applied Energy 85 (2008) 271-296.
Baretto, G.A., "Time Series Prediction with the Self-Organizing Map: A Review." Studies in Computational Intelligence (SCI) (2007): 135-158.
Barros, J., et al., "Time-Frequency Analysis of Harmonics in Power Systems Using Wavelets," WSEAS Transactions on Power Systems, Issue 11, vol. 1, Nov. 2006.
Benaouda, D., et al., "Wavelet-based Nonlinear Multiscale Decomposition Model for Electricity Load Forecasting," Elsevier, ScienceDirect, Neurocomputing 70 (2006) 139-154.
Biagetti, Tatiana, et al., "Automatic Diagnostics and Prognostics of Energy Conversion Processes Via Knowledge-Based Systems," Science Direct, Energy 29 (2004) 2553-2572.
Byoung, UK Kim, et al., "Pattern Analysis in Real Time with Smart Power Sensor." IEEAC Xplore, Paper #1347, Version 2, Updated Dec. 18, 2009.
Campos, Jaime, "Development in the Application of ICT in Condition Monitoring and Maintenance," Elsevier, Computers in Industry, 60 (2009) 1-20.
Cole, A.I., et al., "Algorithm for Non-Intrusive Identification of Residential Appliances," Proc. ISCAS '98, Monterey, CA (1998): 338-341.
Cole, A.I., et al, "Data Extraction for Effective Non-Intrusive Identification of Residential Power Loads," Proc. IEEE Instrumentation and Measurement Technology Conference, St. Paul, MN (1998): 812-815.
Dahmus, Jeffrey B., et al., "An Environmental Analysis of Machining." 2004 ASME International Mechanical Engineering Congress and R&D Expo. Anaheim: Nov. 13-19, 2004.
Dawson, A.J., et al., "Injection Moulding Process Assessment by Energy Monitoring," 2004 IoM Communications, Ltd., Plastics, Rubbers and Composites 2004 vol. 33, No. 1.
Dhar, A., et al., "Modeling Hourly Energy Use in Commercial Buildings With Fourier Series Functional Forms." Journal of Solar Energy Engineering (1998): 217-223.
Dietmair, A., et al., "Energy Consumption Forecasting and Optimisation for Tool Machines," MM Science Journal (2009) 62-67.
Drenker, S., "Commercial Nonintrusive Load Monitoring Systems Beta Test Results," TR-114236; Final Report, Dec. 1998.
Gaouda, A.M., et al., "Monitoring HVDC Systems Using Wavelet Multi-Resolution Analysis," IEEE Transactions on Power Systems, vol. 16, No. 4, Nov. 2001.
Gutowski, Timothy, et al., "Electrical Energy Requirements for Manufacturing Processes," Proc. 13th CIRP International Conference on Life Cycle Engineering (LCE 2006), Leuven, Belgium, (2006): 623-628.
Haberl, J.S., et al., "Development of Graphical Indices for Viewing Building Energy Data; Part I," Journal of Solar Energy Engineering (1998): 156-161.
Haberl, J.S., et al., "Development of Graphical Indices for Viewing Building Energy Data: Part II." Journal of Solar Energy Engineering (1998): 162-167.
Hammond, Geoffrey P., "Industrial Energy Analysis, Thermodynamics and Sustainability," ScienceDirect, Applied Energy 84 (2007) 675-700.
Hart, G.W., "Nonintrusive Appliance Load Monitoring," Proceedings of the IEEE, vol. 80, No. 12, Dec. 1992, p. 1870-1891.
International Energy Agency (IEA), Demonstrating Automated Fault Detection and Diagnosis Methods in Real Buildings, IEA Symposium 217. Oulu: Technical Research Center of Finland (VTT), 2001.
Jain, A.K. Duin, et al., "Statistical Pattern Recognition: A Review." IEEE Transactions on Pattern Analysis and Machine Intelligence (2000): 4-137.
Journal of Central South University of Technology, vol. 12, Issue 2, 2005 Liu,: Investigations and Practices on Green Manufacturing in Machining Systems, pp. 18-24.
Katipamula, Srinivas, "Methods for Fault Detection, Diagnostics, and Prognostics for Building Systems—A Review Part I." International Journal of HVAC&R Research, vol. 11, No. 1, Jan. 2005. p. 3-25.
Katipamula Srinivas, "Methods for Fault Detection, Diagnostics, and Prognostics for Building Systems—A Review Part II." International Journal of HVAC&R Research, vol. 11, No. 2, Apr. 2005, 169-187.
Karatasou, S., et al., "Modeling and Predicting Building's Energy Use with Artificial Neural Networks: Methods and Results." Elsevier, Science Direct, Energy and Buildings (2006): 949-958.
Kiang, Melody Y., "A Comparative Assessment of Classification Methods." Elsevier, Decision Support Systems 35 (2003), 441-454.
Kothamasu, R., et al., "System Health Monitoring and Prognostics—A Review of Current Paradigms and Practices," Int. Journal of Advanced Manufacturing Tech. (2006): 1012-1024.
Laughman, Christopher, et al., "Power Signature Analysis," IEEE Power & Energy Magazine, Mar./Apr. 2003, pp. 56-63.
Lee, Kwangduk Douglas, Jun. 2003, "Electric Load Information System Based on Non-Intrusive Power Monitoring." Massachusetts Institute of Technology.
Lee, Jay., et al., "Intelligent Prognostics Tools and E-Maintenance." Computers in Industry (2006): 476-489.
Lee, W.K., et al., "Exploration on Load Signatures," International Conference on Electrical Engineering, (ICEE) 2004, Japan, Reference No. 725.
Lemmerhirt, J., et al., "Nonintrusive Appliance Load Monitoring system (Nialms)" (1997), Electric Power Research Institute, Inc.
Liangsheng, Qu., et al. "Enhanced Diagnostic Certainty Using Information Entropy Theory," Elsevier, Advanced Engineering Informatics 17 (2003) 141-150.
Marik, Karel, et al., "Decision Support Tools for Advanced Energy Management," ScienceDirect, Energy 33 (2008) 858-873.
Mihalakakou, G., et al., "On the Energy Consumption in Residential Buildings," Elsevier, Energy and Buildings 34 (2002): 727-736.
Munoz, A.A., et al "An Analytical Approach for Determining the Environmental Impact of Machining Processes," Journal of Materials Processing Technology (1995): 736-758.
Norfold, L.K., et al., "Non-Intrusive Electrical Load Monitoring in Commercial Buildings Based on Steady-State and Transient Load-Detection Algorithms," Elsevier, Energy and Buildings 24 (1996): 51-64.
Pappas, S. SP., et al, Electricity Demand Loads Modeling Using AutoRegressive Moving Average (ARMA) Models, Elsevier, Energy 33 (2008), 1353-1360.
"Powers in Nonsinusoidal Situations a Review of Definitions and Physical Meaning." IEEE Transactions on Power Delivery, vol. 5, No. 3, Jul. 1990.
Rasanen, Teemu, et al., "Reducing Energy Consumption by Using Self-Organizing Maps to Create More Personalized Electricity Use Information," ScienceDirect, Applied Energy 85 (2008) 830-840.
Reis, Agnaldo J., "Feature Extraction via Multiresolution Analysis for Short-Term Load Forecasting." IEEE Transactions on Power Systems, vol. 20, No. 1, Feb. 2005.
Seem, J.E., "Pattern Recognition Algorithm for Determining Days of the Week with Similar Energy Consumption Profiles." Science Direct, Energy and Buildings 37 (2005): 127-139.
Seem, J.E., "Using Intelligent Data Analysis to Detect Abnormal Energy Consumption in Buildings." Energy and Buildings 39 (2007) 52-58.
Shaw, S.R., et al., "Instrumentation for High Performance Nonintrusive Electrical Load Monitoring." ASME Journal of Solar Energy Engineering (1998): 224-229.
Tso, Geoffrey P., "Predicting Electricity Energy Consumption: A Comparison of Regression Analysis, Decision Tree and Neural Networks." ScienceDirect, Energy 32, (2007) 1761-1768.
Verdu, Sergio Valero, et al., "Classification, Filtering and Identification of Electrical Customer Load Patterns Through the Use of Self-Organizing Maps," IEEE Transactions on Power Systems, vol. 21, No. 4, Nov. 2006.

Vesanto, J., et al., "Self-Organizing Map in Matlab: the Som Toolbox," Proc. Matlab DSP Conference, Espoo, Finland, (1999): 35-40.

Vesanto, J., et al., "Som Toolbox for Matlab." (2000), Helsinki University of Technology, Helsinki, Finland.

Vijayaraghavan, A., et al., "Automated Energy Monitoring of Machine Tools," Elsevier, CIRP Annals—Manufacturing Technology; (2010).

Zhao, Feng, et al., "Monitoring and Fault Diagnosis of Hybrid Systems," IEEE Transactions of Systems, Man and Cybernetics—Part B: Cybernetics, vol. 35, No. 6, Dec. 2005.

International Search Report and Written Opinion of the International Searching Authority, mailed on Apr. 29, 2011, relating to International Application No. PCT/US2010/048630 filed on Sep. 13, 2010.

* cited by examiner

METHODS AND SYSTEMS FOR ENERGY PROGNOSIS

CROSS-REFERENCE TO RELATED APPLICATIONS

This application claims priority to U.S. Provisional Application No. 61/241,614, filed Sep. 11, 2009, entitled "PRECISION ENERGY MANAGEMENT SYSTEM (PEMS) FOR INDUSTRIAL MACHINERY," the entire contents of which are hereby incorporated by reference.

TECHNICAL FIELD

The present specification generally relates to methods and systems for managing an industrial process and, more specifically, methods and systems for managing an industrial process with an energy prognosis.

BACKGROUND

Manufacturing systems generally deteriorate with usage and age. System deterioration can lead to undesired consequences such as, e.g., higher costs and lower quality. Thus, it is advantageous to manage the undesired consequences of system deterioration with increased knowledge regarding the performance of the system. Maintenance activities have evolved from reactive maintenance and preventive maintenance to condition-based maintenance as the manufacturing community has increased its understanding of system deterioration. For example, when the system conditions can be monitored, a condition-based maintenance can be implemented by determining the maintenance needs of the system dynamically from observed operational conditions of the system. Many of the prognosis and health management techniques in the condition-based maintenance regime require the addition of sensors that are not normally part of the manufacturing process. In many industrial applications, the acquiring of sensors as well as the ability to add on such sensor is difficult at best or not possible at all.

Accordingly, a need exists for alternative methods and systems for managing an industrial process with an energy prognosis without requiring the addition of difficult to obtain sensors.

SUMMARY

In one embodiment, a method for managing an industrial process is provided. A processor may transform an energy related test signal into an energy prognosis. The energy related test signal including effective power test data indicative of electrical energy consumed by an energy consuming machine may be received automatically with the processor. The energy related test signal may be partitioned automatically with the processor into an energy related test sub-signal. Mathematical functions to the energy related test sub-signal may be applied automatically with the processor to extract a feature set of data from the energy related test sub-signal. The feature set of data may be transformed automatically with the processor with a transformation matrix into a reduced test feature set. The reduced test feature set may be input automatically with the processor into a performance assessment algorithm, wherein the performance assessment algorithm is based at least in part upon a reduced training feature set derived from data indicative of electrical energy consumed during healthy operation. The energy prognosis may be generated automatically with the processor, wherein the energy prognosis is based at least in part upon a power-based performance index calculated by the performance assessment algorithm.

In another embodiment, an energy management system may include: an energy consuming machine for producing a product, an energy sensor communicably coupled to the energy consuming machine wherein the energy sensor generates an energy related test signal comprising real power test data and reactive power test data indicative of energy consumed by the energy consuming machine, and a processor communicably coupled to the energy sensor. The processor executes machine readable instructions to: receive the energy related test signal; partition the energy related test signal into an energy related test sub-signal; apply time domain functions and/or frequency domain functions to the energy related test sub-signal to extract a feature set of data from the energy related test sub-signal; transform the feature set of data with a principle component analysis into a reduced test feature set; compare the reduced test feature set to training data indicative of a normal operating condition of the energy consuming machine; generate a power-based performance index with a performance assessment algorithm, wherein the power-based performance index is based at least in part upon a difference between the reduced test feature set and the training data; and generate a fault indication based at least in part upon the power-based performance index.

In yet another embodiment, a toolkit for managing an industrial process is provided. The toolkit is stored on a machine readable medium and includes machine readable instructions to transform electronic data into an energy prognosis. The machine readable instructions may include the following. A signal loading algorithm to receive an energy related test signal including real power test data indicative of electrical energy consumed by an energy consuming machine. A partitioning algorithm to transform the energy related test signal into an energy related test sub-signal. A feature extraction algorithm to transform the energy related test sub-signal into a feature set of data from the energy related test sub-signal. A principal component analysis algorithm to transform the feature set of data into a reduced test feature set. A performance assessment algorithm for comparing the reduced test feature set to a baseline indicative of a normal operating condition of the energy consuming machine. A performance prediction algorithm for generating an energy prognosis that forecasts a future health condition of the energy consuming machine based at least in part upon the reduced test feature set. A visualization algorithm for displaying the energy prognosis.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As used herein with the various illustrated embodiments described below, the following terms include, but are not limited to, the following meanings.

The phrase "communicably coupled" means that components are capable of transmitting data signals with one another such as for example, electrical signals via conductive medium, electromagnetic signals via air, optical signals via optical waveguides, and the like.

The phrase "effective power" means the net transfer of electrical energy in one direction past a sensing point, i.e., effective power is indicative of a transfer of electrical energy. Effective power is commonly measured in kilowatts (kW).

The phrase "reactive power" refers to the portion of electrical energy that is stored and/or returned to the source, i.e., reactive power is indicative of a lack of a transfer electrical energy. Reactive power is commonly measured in volt-amperes reactive (VAr).

The term "sensor" means a device that measures a physical quantity and converts it into a signal which is correlated to the measured value of the physical quantity.

The term "signal" means an electrical and/or electromagnetic waveform, such as DC, AC, sinusoidal-wave, triangular-wave, square-wave, and the like, capable of traveling along and/or within a transmissive medium.

The term "synchronized" means that two signal components are collected at about the same time and/or rate with one another or that the two signal components may be mapped to one another such that they can be analyzed as though they were collected at about the same time and/or rate with one another.

Figure 1:
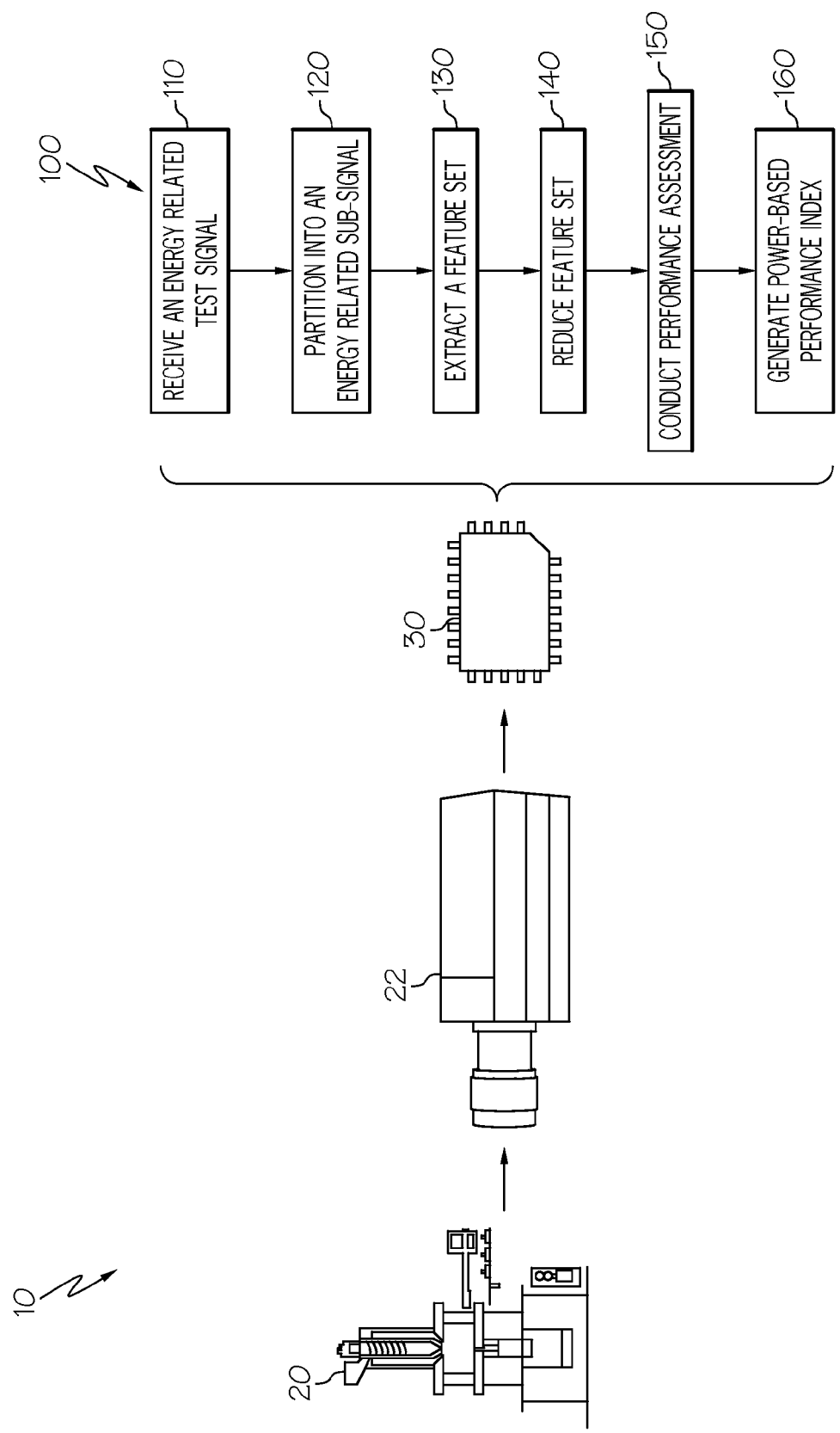
FIG. 1 schematically depicts a system for managing an industrial process according to one or more embodiments shown and described herein.

FIG. 1 generally depicts one embodiment of an energy management system for managing an industrial process. The energy management system generally comprises an energy consuming machine, an energy sensor and a processor that executes machine readable instructions. Various embodiments of the energy management system and various embodiments of methods for managing an industrial process are described in more detail herein.

Referring now to FIG. 1, in the illustrated embodiment, an energy management system 10 may comprise an energy consuming machine 20. The energy consuming machine 20 may be any device that transmits or modifies electrical power such as a machine used for manufacturing or producing a product. Example energy consuming machines include a milling machine, a pressing machine, an injection molding machine, and a grinding machine.

The energy management system 10 may comprise an energy sensor 22 that generates an energy related signal that may be transmitted to another device such as a microprocessor. The energy sensor 22 is communicably coupled to the energy consuming machine 20 such as, for example, at a power input or a controller output. Specifically, the energy sensor 22 may measure electrical energy along the power input to the energy consuming machine 20 and transmit an energy related signal indicative of the measured electrical energy. The energy related signal may comprise data indicative of temperature, humidity, pressure, voltage, current, effective power, reactive power, or combinations thereof. The energy sensor 22 may be a temperature sensor, a humidity sensor, a pressure sensor, a current sensor, a voltage sensor, a power sensor, or a combination thereof. It is noted that the sensors described herein are not limited to sensors that directly observe a physical quantity, i.e., the energy sensor 22 may sense the input or output of an electronic device such as a controller to generate an energy related signal.

Still referring to FIG. 1, the energy management system 10 may comprise a processor 30 for executing machine readable instructions 100. The processor 30 is communicably coupled to the energy sensor 22 and receives an energy related signal. The energy related signal is transformed according to the machine readable instructions 100. The processor 30 may be an integrated circuit, a microchip, a computer, or any other computing device capable of executing the machine readable instructions 100. The processor 30 is communicably coupled to an electronic memory (not depicted in FIG. 1) for storing electronic data. The electronic memory may be RAM, ROM, a flash memory, a hard drive, or any device capable of storing the machine readable instructions 100. In the embodiments described herein, the processor 30 and the electronic memory may be integral with one another, or the processor 30 and the electronic memory may be discrete components communicably coupled with one another.

The machine readable instructions 100 are executed by the processor and may be stored within the electronic memory. The machine readable instructions comprise logic or an algorithm for transforming energy related signals into an energy prognosis. The logic or algorithm may be written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into the machine readable instructions 100. Alternatively, the logic or algorithm may be written in a hardware description language (HDL), such as implemented via either a field-programmable gate array (FPGA) configuration or an application-specific integrated circuit (ASIC), and their equivalents.

Still referring to FIG. 1, in one embodiment the machine readable instructions 100 comprise a process 110 to receive an energy related signal. The energy related signal may comprise effective power test data, reactive power test data, or a combination thereof. The test data is indicative of the energy consumed by an energy consuming machine 20. For example, the test data may correspond to the energy consumed during an industrial process. The energy related signal may also comprise effective power training data, reactive power training data, or a combination thereof. The training data is indicative of electrical energy consumed by the energy consuming machine 20 during a known operating condition such as, for example, a normal condition or a failure condition. The training data may be compiled from the sensed operation of the same machine, the sensed operation of a similar machine or artificially generated to mimic the desired operating condition. Specifically, an injection molding machine may be observed during normal operation in order to compile training data to be applied to the same injection molding machine, another injection molding machine, or a completely different type of machine. Furthermore, the training data may be compiled by a model (e.g., computer simulation or mathematical model) that substantially mimics the desired operation of the energy consuming machine 20.

The terms "energy related," "effective power," "reactive power," "testing," and "training" are utilized throughout the present disclosure. For clarity, it is noted that when the term "energy related" is utilized with the terms "signal" or "sub-signal," the term "energy related" may generally refer to data that is any possible combination of effective power data, reactive power data, testing data, and training data. For clarity, it is also noted that when the terms "effective power data" and "reactive power data," are utilized they may generally refer to testing data and/or training data. Similarly, for clarity, it is noted that when the terms "testing data" and "training data," are utilized they may generally refer to effective power data and/or reactive power data.

The machine readable instructions 100 may further comprise the process 120 to partition the energy related signal into an energy related sub-signal. The energy related signal may be partitioned according to a time block, a cycle or a cycle step. Examples of each of the partitioning techniques are described in further detail below.

In one embodiment, the energy related signal is partitioned into an energy related sub-signal according to a time block. For example, a time block size corresponding to a time period of interest (e.g., a single repeated step, a collection of repeated steps, or a shift) may be defined according to knowledge of an industrial process. Specifically, a user familiar with the process or a statistical analysis of the industrial process may define a time block size. Once defined, the time block size may be utilized to divide the energy related signal into equal energy related sub-signals having a length, i.e., number of data points, corresponding to the time block size.

In another embodiment, the energy related signal is partitioned into an energy related sub-signal according to a cycle. Cycles may be automatically extracted from the energy related signal utilizing a cycle extraction technique. When the energy related signal comprises effective power data and reactive power data and the effective power data and the reactive power are synchronized with one another, the cycle extraction technique can extract machine start of cycles.

For example, the cycle extraction technique can be applied to extract the machining start of cycles using the reactive power data as a trigger. The indexes, corresponding to the sequence of the reactive power data, of each start of cycle can be mapped onto the effective power data. This can be achieved by first extracting all eligible data points that satisfy $$RP_i \geq RP_{threshold} \qquad (1),$$

where $RP_i$ refers to the reactive power data and $RP_{threshold}$ is a machine dependent heuristic threshold value.

The cycle extraction technique satisfies equation (1) to extract all reactive power values that exceed the machine dependent heuristic threshold value. The extracted reactive power data are arranged in order of occurrence and utilized to determine the first start of cycle. Starting with the reactive power data corresponding to the first extracted reactive power data point, the reactive power data is searched for the nearest data point having a near-zero value occurring after the first extracted reactive power data. The near-zero value corresponds to a reactive power data point having a value of about 0 kVAr or a reactive power data point that is larger or smaller than about 0 kVAr when reactive power data lacks a data point having a value of about 0 kVAr. The near-zero value is indicative of a lack of power consumption, i.e. a new machining cycle is about to start. The near-zero value may be obtained using a sign-change rule that searches each consecutive point of the reactive power data occurring after first extracted reactive power data point for the first sign-change from a positive reactive power value to a negative reactive power value. Once the near-zero value has been obtained, a data index (e.g., time stamp or numeric index) corresponding to the near-zero value can be utilized as the start of cycle data index. Similarly, all other cycles can be extracted one-by-one using a backward-forward search rule that compares consecutive reactive power data points in combination with the sign-change rule to obtain start of cycle indexes for all of the reactive power data. The backward-forward search rule, which reduces the probability of obtaining redundant values, is given by, $$RP_{SOC_n} \geq RP_{SOC_{n-1}} \,\&\, RP_{SOC_n} > RP_{SOC_{n+1}} \qquad (2),$$

where RP refers to the reactive power data, $SOC_{n-1}$ refers to the $(n-1)^{th}$ start of cycle data index, $SOC_n$ refers to the $n^{th}$ start of cycle data index, and $SOC_{n+1}$ refers to the $(n+1)^{th}$ start of cycle data index.

Figure 2:
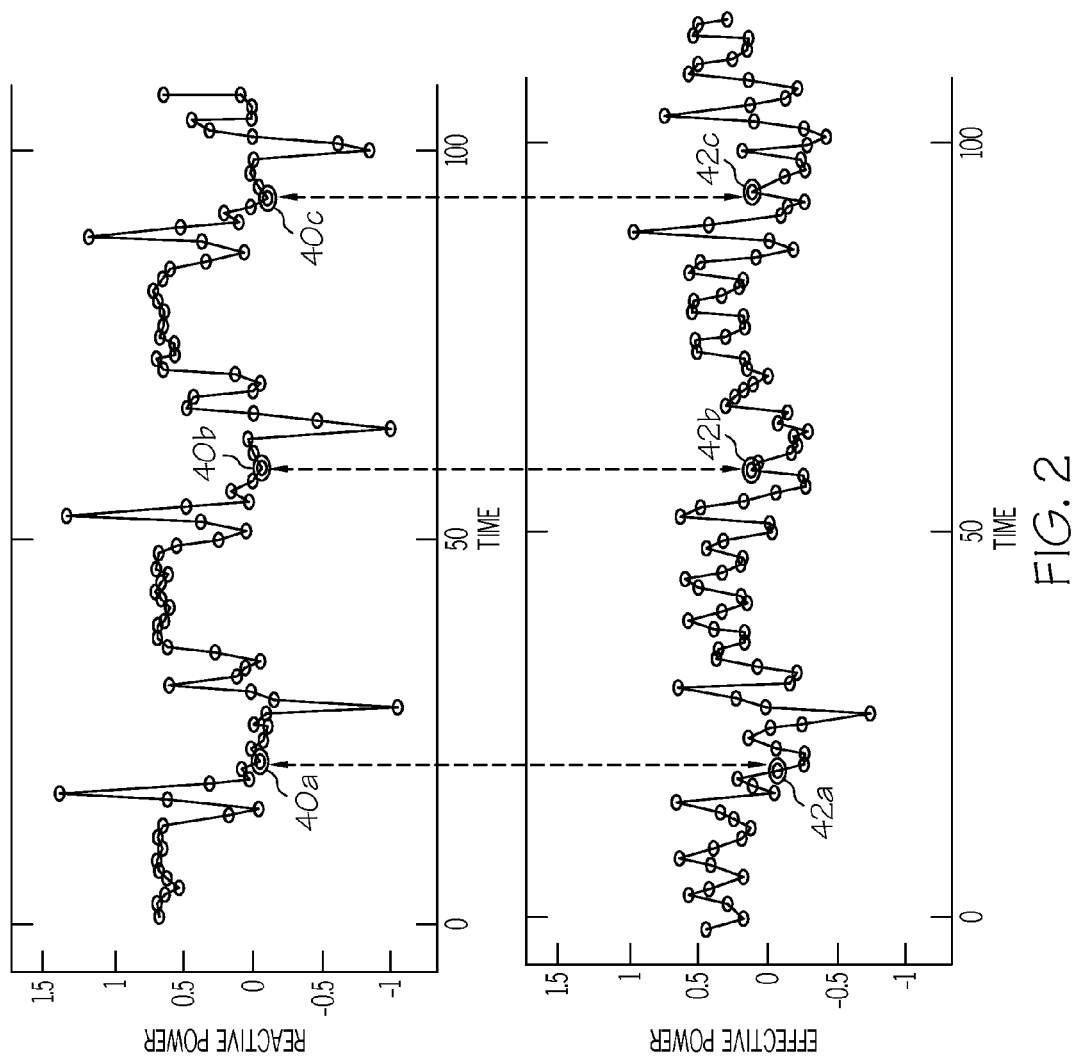
FIG. 2 graphically depicts a cycle extraction technique according to one or more embodiments shown and described herein.

FIG. 2 graphically depicts reactive power data and effective power data. The reactive power data and the effective power data are synchronized according to time. The start of cycle data indexes of a first near-zero value 40a, a second near-zero value 40b, and a third near-zero value 40c, as determined by the sign change rule and the backward-forward rule, can be mapped (generally indicated in FIG. 2 by dashed lines) to the effective power data. Specifically, a first start of cycle 42a corresponding to the first near-zero value 40a, a second start of cycle 42b corresponding to a second near-zero value 40b, and a third start of cycle 42c corresponding to a third near-zero value 40c may be mapped in the effective power data. After mapping, the effective power data may be segmented into cycles and analyzed at a cycle level resolution. For clarity, and not by way of limitation, pseudo-code for one embodiment of the cycle extraction is provided below.

The pseudo-code provided below is to be interpreted according to the immediately following definitions. RP refers to reactive power data value at time t=i. $RP_{threshold}$ refers to the machine dependent heuristic threshold value (e.g., $RP_{threshold}$=0.87 for the embodiment depicted in FIG. 2). EP refers to effective power data value at time t=i. $SOC_i$ refers to the start of cycle at t=i, where $SOC_1$ is the first start of cycle.
READ RP and EP
SAVE All RP such that: $RP_1 > RP_{threshold}$
Initially, the first start of cycle is found and all subsequent indexes (potential candidates for a start of cycle) are extracted from the reactive power data

```
FOR     i = 1: length (RP)
   IF        RP₁ ≧ RP₂     THEN
             SET SOC₁ = RP₁
   ELSEIF    RPᵢ ≧ RPᵢ₋₁ AND RPᵢ > RPᵢ₊₁ THEN
             SAVE {RPᵢ}
```

-continued

```
            ENDIF
    ENDFOR
```

Next, a process that relies on sign changes is used to find all indexes of $RP_i$ closest to zero.
The consecutive point $RP_{i+1}$ is defined as the start of cycle.

```
FOR     i = 1: length {RP_i}
        COMPUTE    {Sign_i} for all {RP_{i+1} - RP_i}
        IF         {Sign_i} = 1 -> RP_{i+1} - RP_i > 0
        ELSEIF     {Sign_i} = 0 -> RP_{i+1} - RP_i = 0
        ELSEIF     {Sign_i} = -1 -> RP_{i+1} - RP_i < 0
        ENDIF
        FIND       All {Sign_i} ≠ 1 -> All RP_{i+1} - RP_i ≦ 0
        SET        RP_{i+1} = SOC_{i+1}    (e.g. RP_2 = SOC_2)
        REPEAT     for all i
ENDFOR
```

In the embodiments described herein, the energy related signal can be partitioned into an energy related sub-signal according to a cycle step. Cycle steps may be automatically extracted from the energy related signal utilizing an automated cycle step extraction technique. For example, in a traditional injection molding process, a typical cycle includes several steps such as, but not limited to, die closing, injection, rotation, die opening, ejection, and feed. From expert knowledge and operational specifications of the process, estimates of power specifications and duration of each cycle step may be known. The process knowledge may be incorporated into the automated cycle step extraction technique and assist in segmenting a cycle into cycle steps. The cycle may be provided to the automated cycle step extraction technique by manual entry according to process knowledge, the cycle extraction technique, PLC logs or any other source capable of providing machine cycle information.

When the energy related signal comprises effective power data and reactive power data synchronized with one another, the automated cycle step extraction technique can extract cycle steps from the energy related signal. The reactive power can be used as a trigger for machine start of cycle extraction and subsequent extraction of machine cycle steps. For example, the cycle extraction technique may extract cycle steps from an injection molding energy related signal indicative of a die close, injection, die open, eject, and the like. Additionally, the cycle extraction technique may operate more efficiently in extracting cycle steps from an energy related signal indicative of an industrial process having substantially consistent operating conditions such as, for example, consistent cycle behavior and consistent material flows through the process.

Figure 3:
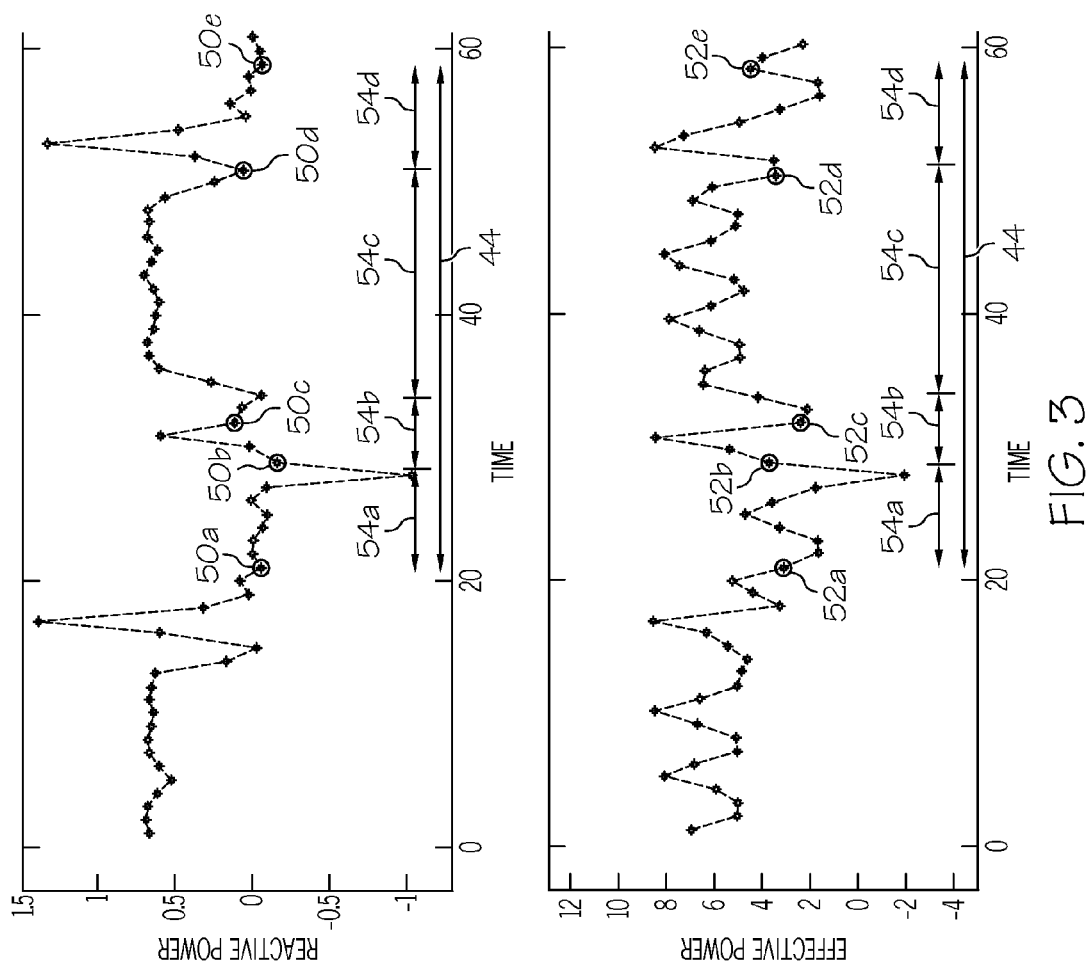
FIG. 3 graphically depicts a cycle step extraction technique according to one or more embodiments shown and described herein.

Referring now to FIG. 3, the cycle step extraction technique can analyze reactive power data to extract start of cycle indexes, as described herein. Once the start of cycle indexes are determined for the reactive power data, the cycle step extraction technique may further analyze a cycle 44 corresponding to the start of cycle indexes. For example, a sign-change rule, as described herein, may be utilized to extract cycle step indexes from a cycle 44 of the reactive power data. The cycle step extraction technique may extract a first cycle step index 50a, a second cycle step index 50b, a third cycle step index 50c, a fourth cycle step index 50d, and a fifth cycle step index 50e from the reactive power data. When the reactive power data is synchronized with the effective power data, the cycle step indexes can be mapped to their counterpart indexes in the effective power data. Specifically, the first cycle step index 50a, the second cycle step index 50b, the third cycle step index 50c, the fourth cycle step index 50d, and the fifth cycle step index 50e from the reactive power data may be mapped to a first cycle step index 52a, a second cycle step index 52b, a third cycle step index 52c, a fourth cycle step index 52d, and a fifth cycle step index 52e of the effective power data, respectively. After mapping, the effective power data may be segmented into cycle steps and analyzed at a cycle step level resolution. As depicted in FIG. 3, the cycle 44 can be segmented into a first cycle step 54a, a second cycle step 54b, a third cycle step 54c, and a fourth cycle step 54d according to the extracted cycle step indexes. For clarity, and not by way of limitation, pseudo-code for one embodiment of the cycle step extraction technique is provided below.

The pseudo-code provided below is to be interpreted according to the immediately following definitions. $SOC_i$ to the start of cycle at t=i, where $SOC_i$ is the first start of cycle. $RP_i$ refers to reactive power data value at time t=i. $RP_{thres-L}$ refers to a machine dependent heuristic lower threshold value (e.g., $RP_{thres-L}=-0.4$ for the embodiment depicted in FIG. 3). $EP_i$ refers to effective power data value at time t=i. $CS_{ij}$ refers to the cycle step index j for extracted cycle i where i∈{1:n}, j∈{1:4}.

```
READ    RP_i and EP_i
FOR     counter = 1: length (SOC_i)
        READ       Cycle_Data = { RP_i : RP_{i+1} }
        COMPUTE    Cycle_Diff = RP_{i+1} - RP_i   for all i cycles
        FIND       All RP_i < RP_{thresh-L} in Cycle_Data
        SAVE       All RP_i such that: RP_i < RP_{thresh-L}
                   Set RP_i -> CS_{i1}           (initial index for
                                                  cycle step 1)
                   FOR   i = 1: length(Cycle_Diff)
                   IF    sign(cycle_diff (i+1)) ≠
                         sign(cyclediff(i))
                   THEN  Set -> CS_{i2}          (initial index for
                                                  cycle step 2)
                   ENDIF
        ENDFOR
        FOR ii = 1: length(Cycle_Diff)
                   IF    Cycle_Diff(ii) < -0.2 (half the RP
                         value)
                   THEN  Set CS_{i3}             (initial index for
                                                  cycle step 3)
                   ENDIF
        ENDFOR
```

Convert all local indexes to global cycle step indexes.
  $CS_{i1}$=Initial $CS_{i1}$ Index+$SOC_i$
  $CS_{i2}$=Initial $CS_{i2}$ Index+$SOC_i$
  $CS_{i3}$=Initial $CS_{i3}$ Index+$SOC_i$
Map the extracted cycle steps within each cycle for RP.
  $RP_{i1}$=RP {$SOC_i$:$CS_{i1}$}
  $RP_{i2}$=RP {$CS_{i1}$:$CS_{i2}$}
  $RP_{i3}$=RP {$CS_{i2}$:$CS_{i3}$}
  $RP_{i4}$=RP {$CS_{i3}$:$SOC_{i+1}$}
ENDFOR Referring back to FIG. 1, the machine readable instructions 100 may comprise the process 130 to extract a feature set from the energy related signal and/or energy related sub-signal. The feature set is extracted by applying mathematical functions such as time domain functions and/or frequency domain functions. The time domain functions include mean, RMS, crest factor, kurtosis, standard deviation, skewness, peak-to-peak, maximum, minimum, zero-crossing rate, and the like. Frequency domain features include mean, RMS, crest factor, kurtosis, standard deviation, skewness, peak-to-peak, maximum, minimum, zero-crossing rate, fundamental frequency amplitude, harmonic frequency amplitudes, spectral entropy, spectral entropy amplitude, and the like.

The feature set may be extracted by applying the desired mathematical function to an energy related sub-signal, i.e., the function may be applied to a time block, a cycle or a cycle step. In one embodiment, where the energy related sub-signal is partitioned according to a time block, a total of twenty four features are extracted per time block (e.g., ten time-domain and fourteen frequency-domain features). In another embodiment, where the energy related sub-signal is partitioned according to a cycle, nine time domain features per cycle are extracted. In another embodiment, where the energy related sub-signal is partitioned according to a cycle step, fifteen time domain features (nine from effective power data and six from reactive power data) per cycle step are extracted. It is noted that, as the resolution of the partitioning is improved (e.g., time block to cycle) frequency-domain analysis becomes less feasible. Furthermore, as the resolution of the partitioning is further improved (e.g., cycle to cycle step) robustness may be improved by extracting features from both the effective power data and the reactive power data.

Referring still to FIG. 1, the machine readable instructions 100 may comprise the process 140 to reduce a feature set. A feature set extracted from an energy related sub-signal may be reduced to a reduced feature set using linear dimensionality reduction algorithms such as, for example, principal component analysis or nonlinear dimensionality reduction algorithms such as, for example, kernel principal component analysis, locally linear embedding, Hessian locally linear embedding, Laplacian eigenmaps, and LTSA. In the embodiments described herein, a principal component analysis may be utilized for feature reduction. After feature extraction, the feature set can be characterized as a random variable with a multivariate normal distribution. Principal component analysis may transform the feature set into a lower dimensional random variable with substantially independently distributed components. A covariance matrix may be calculated by $$C = cov\{F_{set}\} \quad (3),$$

where C is a covariance matrix of the feature set and $F_{set}$ is the feature set. Eigenvalues and eigenvectors are represented by $$[V, A] = eig(C) \quad (4),$$

where A is a diagonal matrix consisting eigenvalues sorted in descending order, V is the normalized eigenvector matrix arranged according to the eigenvalues, and C is a covariance matrix of the feature set. The reduced feature set may be obtained for a given SVD cut-off value (e.g., 0.95) by selecting largest p eigenvalues such that $$\sum_{i=1}^{p} \lambda_i \geq SVD \times \sum_{i=1}^{r} \lambda_i \quad (5)$$

and $$\sum_{i=1}^{p-1} \lambda_i < SVD \times \sum_{i=1}^{r} \lambda_i, \quad (6)$$

where p is the dimension of the reduced feature set, $\lambda_i$ is the $i^{th}$ eigenvalue from the diagonal matrix A, r is the dimension of the feature set, and the eigenvalues are sorted in descending order such that $\lambda_1 > \lambda_2 > \ldots > \lambda_r$. The feature set is accordingly transformed into a normalized and reduced feature set, which by definition has a uniform multivariate normal distribution.

Referring still to FIG. 1, the machine readable instructions 100 may comprise the process 150 to conduct a performance assessment of the reduced feature set. The performance assessment analyzes the reduced feature set and classifies the information by applying pattern recognition techniques such as, for example, statistical pattern recognition and/or neural network pattern recognition.

In one embodiment, the performance assessment comprises statistical pattern recognition. Statistical pattern recognition analytically compares the probability distribution of a feature set and/or a reduced feature set. Feature sets can be modeled as a types of probability distributions (e.g., Gaussian, binomial, Poisson, etc.) and the overlap of the probability distributions being correlated to likeness of feature sets. By calculating the overlap of probability distribution of a current feature set with the probability distribution of a known condition (i.e., normal or failure), a system's performance metric or probability of failure may be obtained. For example, as described herein, a reduced feature set generated by a principal component analysis is substantially Gaussian. The overlap of reduced feature sets may be calculated by a cumulative density function of a p degree of freedom Chi-square distribution, where p is the dimension of the reduced feature set as is described above. Specifically, a one to one comparison of each feature in the feature sets may be utilized as the random variable in the p degree of freedom Chi-square distribution, i.e., the difference of each feature may be described by the Chi-square distribution. Furthermore, a single instance of test data may be compared to an average of multiple instances of training data. Therefore, a power-based performance index may be given by $$PPI = 1 - cdf_{\chi_p^2} \sum_{j=1}^{} \lfloor \hat{Y}_{ij}^2 \rfloor, \quad (7)$$

$$\hat{Y} = (Y - \overline{A}) V_p A_p^{-\frac{1}{2}}, \quad (8)$$

and $$\overline{A} = [1 1 \ldots 1]_n \cdot \overline{a}_i, \quad (9)$$

where Y is a reduced feature set of test data, $\overline{a}_i$ is the average of the $i^{th}$ column of the reduced feature sets of training data, $V_p$ is eigenvectors from the principle component analysis, $A_p$ is the eigenvalues from the principle component analysis, and I=1, 2, . . . , n.

In another embodiment, an artificial neural network is utilized to conduct the performance assessment. For example, a self-organizing map, which is a subtype of artificial neural networks, represents multi-dimensional data in lower dimensional space while preserving the topological properties of the input space. The self-organizing map may be a single layer feed-forward neural network with the output nodes arranged in a low dimensional (e.g., 2D or 3D) grid for visualization. In such a configuration, each input is connected to all output nodes and a weight vector with the same dimensionality as the input vectors is attached to every node. The number of input dimensions is commonly higher than the output grid dimension.

The self-organizing map may be organized according to training having a selection and learning process. Node weights matching the input vector are selected and neighboring nodes change themselves such as by supervised learning to become more like the input vector. According to the embodiments described herein, the multi-dimensional data may be a reduced feature set indicative of machine operation. The self-organizing map may be trained according to a number of reduced feature sets corresponding to multiple samples of training data. The size of the self-organizing map is dependent upon the number of samples of training data and is determined by $$m = 5 \times \sqrt{n} \qquad (10),$$

where m is the size of the map and n is the number of samples of training data.

The training may occur over several iterations. In one embodiment, the training progresses according to the enumerated steps below. 1. Each node weight is initialized, for example, randomly according to an algorithm which approximates a random number generator. 2. A vector is randomly chosen from the set of training data and presented to the lattice. 3. Each node is examined to calculate a best matching unit, i.e., the node weight closest to matching the input vector in the input space according to a measuring criterion (e.g., a distance measure). 4. The radius of the neighborhood of the best matching unit is calculated and any nodes found within the radius are considered inside the best matching unit's neighborhood. 5. Each neighboring node's weight vector (from step 4) is adjusted to more closely match the input vector. The closer a node is to the best matching unit, the more its weights get altered. The weight vector is adjusted according to $$W(t+1) = W(t) + L(t)(V(t) - W(t)) \qquad (11),$$

where t represents the iteration step, L(t) represents a learning rate that decreases over time, W(t) represents the old weight, and V(t) represents the input vector. 6. Repeat steps 2-5 above for a number of iterations or until a terminating criterion is met.

A generalized competitive learning scheme may be utilized to adjust the weight vectors in step 5. The generalized competitive learning scheme moves each of the weight vectors to the regions of vector space that are more dense in the input vector (e.g., reduced feature set of training data). When an input vector is presented to the generalized competitive learning scheme, all representatives compute each other and the winner is updated to incrementally move closer towards the input vector. For clarity, and not by way of limitation, pseudo-code for one embodiment of the generalized competitive learning scheme is provided below.

The pseudo-code provided below is to be interpreted according to the immediately following definitions. t represents the current iteration step. $t_{max}$ represents the maximum allowable number of iterations. $m_{init}$ represents the initial allowable number of clusters. $m_{max}$ represents the maximum allowable number of clusters. X represents the input vector with x being a subset of X. W represents the weight vector with $w_j$ being a subset of W.

---

INITIALIZE t = 0 and m = $m_{int}$
REPEAT
   t = t+1
   PRESENT a new randomly selected x from X
   DETERMINE the winning representative $w_j$
   IF ((x is not 'similar' to $w_j$) AND (m < $m_{max}$)) THEN (New Cluster)
     M=m+1
     $w_m$ = x
   ELSE: Parameter Updating
   END
UNTIL (Convergence Occurs) OR (t > $t_{max}$)
IDENTIFY a cluster represented by all $w_j$
TERMINATE when criterion $\|W(t) - W(t-1)\| < \epsilon$ is satisfied

---

Figure 4:
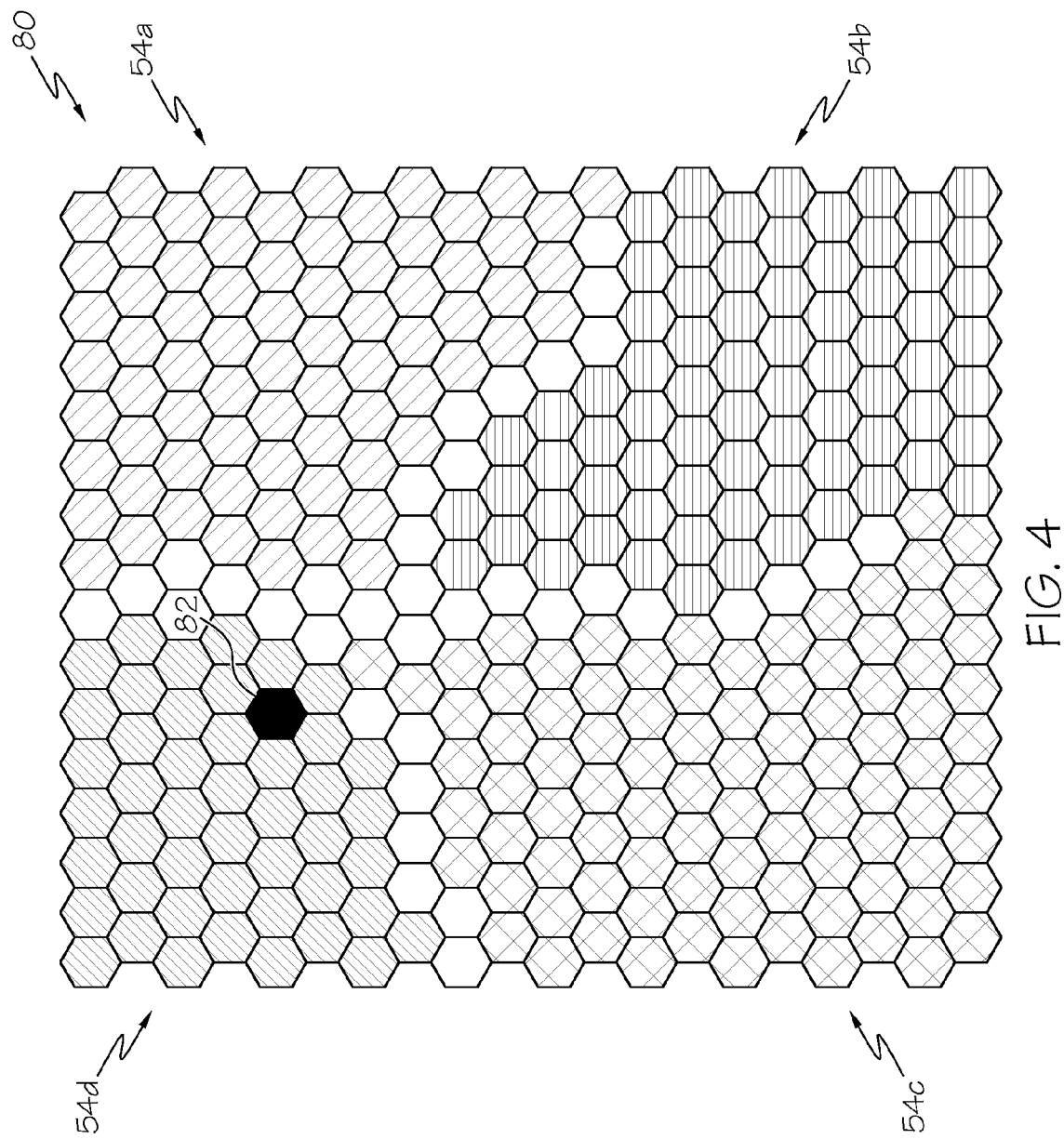
FIG. 4 graphically depicts a self-organizing map according to one or more embodiments shown and described herein.

A self-organizing map trained as described above comprises a number of clusters depending upon the number of cycle steps extracted during partitioning. For example, FIG. 4 depicts a self-organizing map 80 that was trained with training data having four extracted cycle steps. The self-organizing map 80 comprises four distinct clusters representing the different cycle steps (first cycle step 54a, second cycle step 54b, third cycle step 54c, and fourth cycle step 54d). The self-organizing map can be used to visualize testing data such that the testing data is depicted as a hit point 82 indicative of which cycle step the testing data is correlated with. Specifically, each feature set or reduced feature set of test data is indicated as a hit point 82 on the self-organizing map 80 in one of the cycle step clusters. Furthermore, a trained self-organizing map may automatically classify input vectors by using a distance measure to match it to the neuron whose weight vector lies closest to the input vector.

In one embodiment, the distance metric is a minimum quantization error computed as a fault detection measure to evaluate every incoming test data point. This minimum quantization error quantifies the difference between a known behavior (e.g., normal operating condition) corresponding to the training data and the test data (e.g., feature set, or reduced feature set). Each new test data point is input into the trained self-organizing map as a vector and mapped to a location. The minimum quantization error can be determined by $$MQE = \|D - w_{bmu}\| \qquad (12),$$

where MQE is the minimum quantization error, D is the feature vector of the test data, and $w_{bmu}$ is the weight vector for the best matching unit on the map.

For example, if the training data corresponds to healthy operation, the self-organizing map tracks the cycles and underlying cycle steps of test data indicative of healthy operation. Additionally, hit points indicative of healthy operation are classified according to the machine cycle step which is currently running The distance measure may be utilized for detecting a fault corresponding to an anomalous operation. For example, the distance between the test data and its best-matching unit on the self-organizing map will yield a higher value than during healthy operation. As is described in greater detail below, the distance determined by the minimum quantization error can be utilized for threshold alarming.

Referring back to FIG. 1, the machine readable instructions 100 may comprise the process 150 to generate a power-based performance index. According to the embodiments described herein, the power-based performance index may be calculated to predict current behavior or future behavior. Power-based performance index values utilized for predictions of current behavior are described herein above such as, for example, outputs from statistical pattern recognition or minimum quantization error. Power-based performance index values for predicting future behavior may include parametric and non-parametric predictive models such as, for example, Gaussian process regression, auto-regressive moving averages, neural network based predictions, similarity based predictions, particle filter based methods, and regression spline based predictive models.

In one embodiment, regression spline based predictive models are utilized to predict future performance degradation from historic power-based performance indexes. The models are developed using cubic splines, i.e., mathematical functions parametrically defined piecewise by polynomials. The regression spline based predictive models are trained using historic power-based performance indexes. With each new performance value, the model parameters are updated to give a predicted performance value (e.g., for the next cycle or the next cycle step).

Alarms may be set to indicate when the regression spline based predictive model indicates a fault will occur in the future. For example, historic power-based performance indexes generated by statistical pattern recognition analysis of training data may be used to set an alarm threshold of $$PPI_{thresh} = \mu(PPI) - 3\sigma(PPI) \qquad (13),$$

where PPI is the historic power-based performance indexes and $PPI_{thresh}$ is the alarm threshold based on the average and standard deviation of historic values. When the predicted power-based performance index is less than $PPI_{thresh}$ indication of a fault may be provided. Similarly, the historic power-based performance indexes generated by minimum quantization error analysis of training data may be used to set an alarm threshold of $$PPI_{thresh} = \max(PPI) + 3\sigma(PPI) \qquad (14),$$

where PPI is the historic power-based performance indexes and $PPI_{thresh}$ is the alarm threshold based on the maximum and standard deviation of historic values. A potential fault may be predicted to occur in the system when predicted power-based performance index is less than $PPI_{thresh}$. With each new data point from the test data, a new power-based performance index can be predicted at least one cycle ahead and/or at least one cycle step ahead.

According to the embodiments described herein, an industrial process may be managed according to an energy prognosis. The energy prognosis may identify the health of an energy consuming machine by comparing test data to training data indicative of a known condition. Thus, the energy prognosis is related to a known condition of the test data (e.g., healthy or unhealthy). For example in one embodiment, testing data may be analyzed according to time blocks. The time block information can be analyzed to generate power-based performance indexes. An energy prognosis may be made when there is a statistically significant reduction in any two consecutive power-based performance indexes or when the power-based performance index exceeds a heuristic threshold. In another embodiment, testing data may be analyzed according to cycles to generate power-based performance indexes. An energy prognosis may be made when a power-based performance index is below a threshold equal to the mean of the training data minus three standard deviations of the training data. In a further embodiment, testing data may be analyzed according to cycle steps to generate power-based performance indexes. An energy prognosis may be made when a power-based performance index exceeds a threshold equal to the maximum of the training data plus three standard deviations of the training data. Additionally it is noted, that the energy prognosis may be contemporaneous with the testing data, i.e., a prediction of current behavior, or may be predictive, i.e., a prediction of future behavior.

Figure 5:
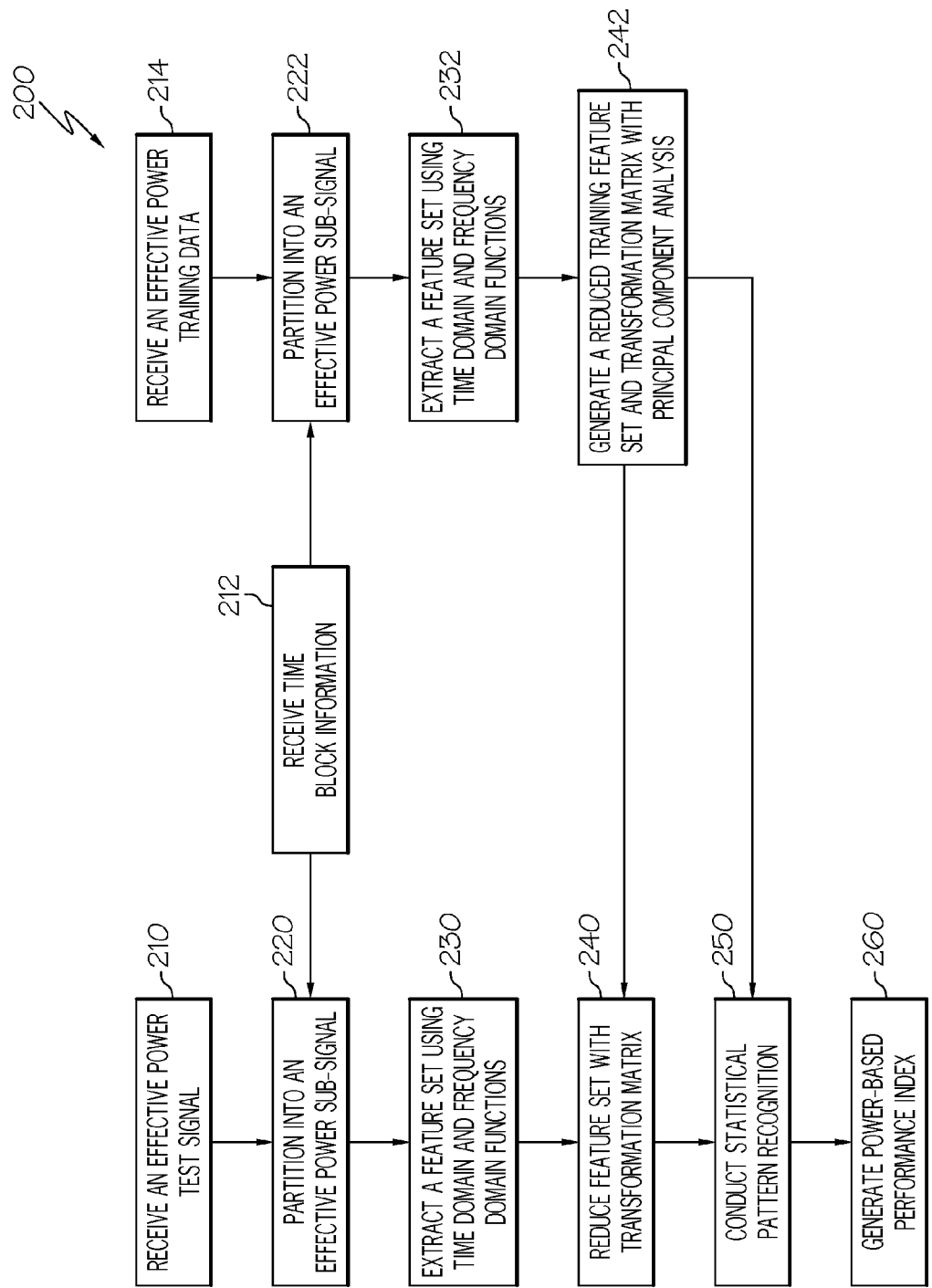
FIG. 5 depicts a flow chart of a method for managing an industrial process according to one or more embodiments shown and described herein.

Referring to FIG. 5, one embodiment of a method 200 for managing an industrial process is depicted. The method 200 relies on a user-defined time block for computation of a power-based performance index per time block. The time block can be estimated from expert operational knowledge and/or historic data characterizing the industrial process. For example, industrial processes typically follow a consistent operating procedure which yields abundant and representative data with known power usage conditions (normal or faulty). The data may be utilized for training and estimation of time block size. The method 200 comprises the process 212 for receiving time block information such as, for example, by a data entry, output from memory or output of a PLC. The time block information is utilized to process training data as well as testing data. According to the process 214 an effective power training data is received. The training data is utilized for supervised training of a model and comprises effective power data. The training data is input to the process 222 to be partitioned into an effective power sub-signal. During partitioning, the training data is divided into equal segments having a length equal to the time block. Following partitioning, the process 232 extracts a feature set using time domain and frequency domain functions. The functions are applied across the entire time block to generate a training feature set. The process 242 generates a reduced training feature set and a transformation matrix with a principal component analysis. The principal component analysis operates as described herein to generate a reduced feature set that is normalized and approximately Gaussian. Additionally, the eigenvalues and eigenvectors from the analysis of the training data may be utilized as a transformation matrix for use with testing data.

Upon training the model, the method 200 utilizes output from training to convert effective power data into a power-based performance index ranging from about 0 to about 1 for a normalized model, where 1 is indicative of an acceptable level of operation and 0 is indicative of an unacceptable level of operation. The process 210 receives an effective power test signal from a power consuming machine. The process 220 partitions the effective power signal into an effective power sub-signal according to the time block. The process 230 extracts a feature set using time domain and frequency domain functions. The feature set is input to the process 240, where the feature set is reduced into a reduced feature set with transformation matrix from training. In alternative embodiments, the reduced feature set may be generated by a principal component analysis using the same SVD cut-off value from training. The normalized reduced test feature set is input into process 250 for statistical pattern recognition. Statistical pattern recognition calculates the overlap between the reduced test feature set and an average of the training feature sets with a cumulative density function of p degree of freedom Chi-square distribution. The output of the statistical pattern recognition, which indicates a probability of failure value between about 0 and about 1, may be directly used to generate a power-based performance index in process 260. In further embodiments, an ongoing statistical pattern recognition model will output numerous power-based performance indexes. Such indexes may be collected and used with a prediction algorithm to generate a power-based performance index that predicts what the power-based performance index will be for the next time block.

Figure 6:
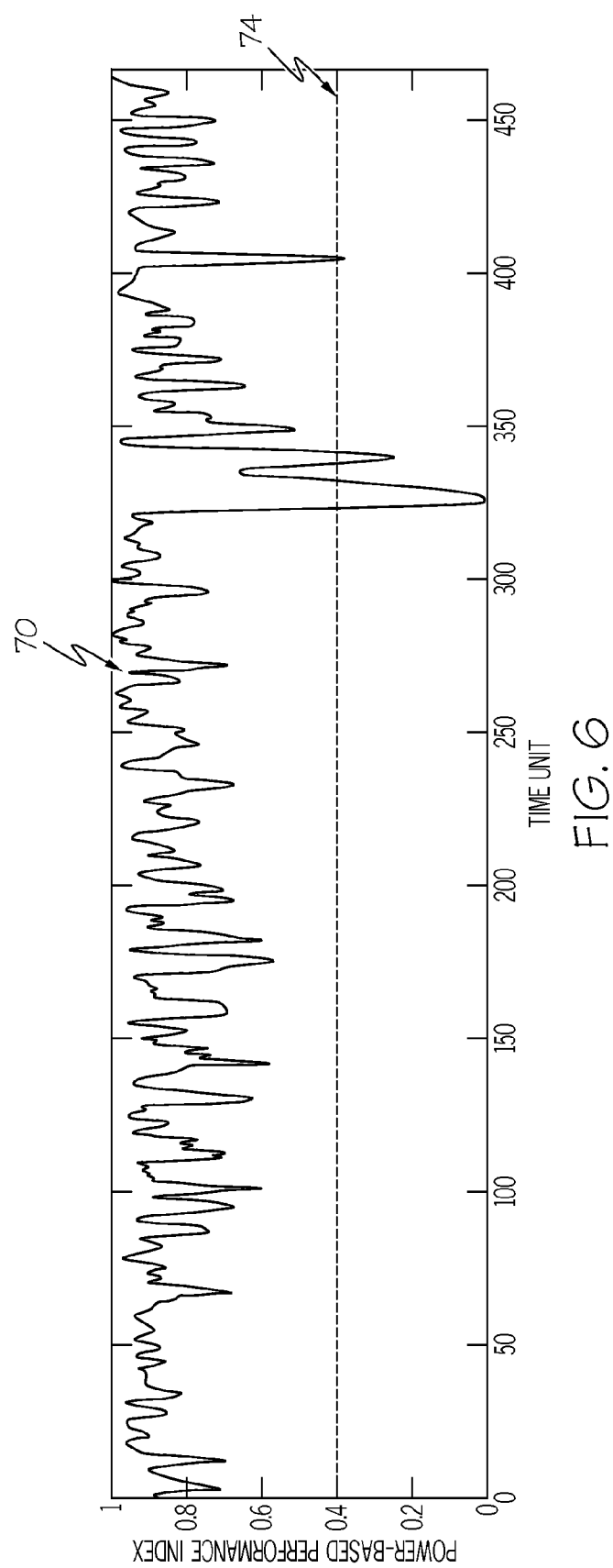
FIG. 6 graphically depicts power-based performance indexes over time according to one or more embodiments shown and described herein.

Referring now to FIG. 6, a heuristic alarm band 74 can be graphed with a power-based performance index curve 70. An alarm indicating a potential fault occurs when the power-based performance index curve 70 crosses the heuristic alarm band 74 (depicted in FIG. 6 as being equal to 0.4). The heuristic alarm band 74 may be set to any value that estimates a failure such as, for example, an estimate from process knowledge or historic data indicative of known failures. In another embodiment, the alarming mechanism may be implemented such that when a statistically significant degradation occurs (a statistically significant reduction in any two consecutive power-based performance indexes) an alarm is raised to indicate a potential fault.

Figure 7:
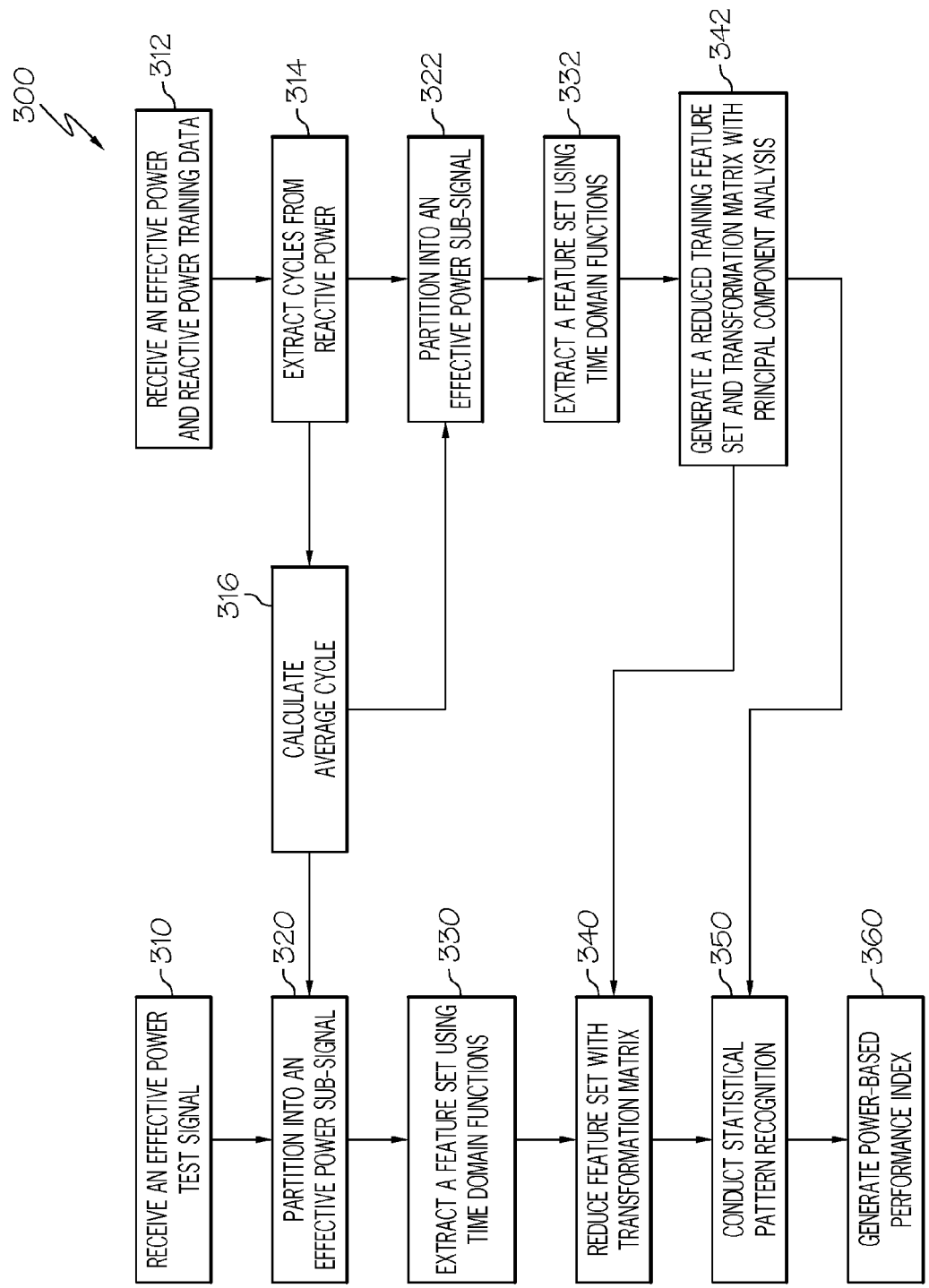
FIG. 7 depicts a flow chart of a method for managing an industrial process according to one or more embodiments shown and described herein.

Referring now to FIG. 7, another embodiment of a method 300 for managing an industrial process is depicted. The method 300 utilizes a cycle extraction technique to extract cycle information from reactive power test data for computation of a power-based performance index per cycle. The cycle extraction technique does not require a PLC signal as a trigger to extract cycle information. However, for validation, the extracted cycle information can be validated against an actual PLC signal to ensure the accuracy of the cycle extraction prior to deploying the model. The method 300 is largely analogous to the method 200 with average cycle length replacing time blocks. Thus, the method 300 may be deployed, e.g., to manage industrial processes which comprise substantially consistent operating periods where representative data with known power usage conditions are available for training. The process 312 receives effective power training data and reactive power training data, which may be synchronized. The process 314 extracts cycles from reactive power training data with the cycle extraction technique. The cycles are extracted from the training and analyzed by the process 316 to calculate an average cycle of the training data. Since, industrial processes commonly operate with consistent cycles, average cycle values may be utilized to partition effective power data. The average cycle is utilized in process 322 to partition the effective power training data into an effective power sub-signal. A feature set is extracted from the effective power sub-signal using time domain functions in process 332. A reduced training feature set and a transformation matrix is generated with a principal component analysis in process 342. An effective power test signal is received by the process 310 and the effective power test signal data is partitioned into an effective power sub-signal according to the average cycle in process 320. A feature set is extracted with time domain functions from the effective power sub-signal, which has been divided into cycle segments, in process 330. The feature set is reduced into a reduced feature set using the transformation matrix from training in process 340. In process 350, statistical pattern recognition is conducted, as is described in further detail above, to calculate the overlap between the reduced test feature set and the average of the reduced training feature sets. A power-based performance index is generated in process 360. The power-based performance index is indicative of the overlap between the reduced test feature set and the average of the reduced training feature sets. Therefore, the output of the statistical pattern recognition may be directly used as the current power-based performance index, or historic power-based performance indexes may be input into a predictive model to predict a power-based performance index one cycle into the future.

Figure 8:
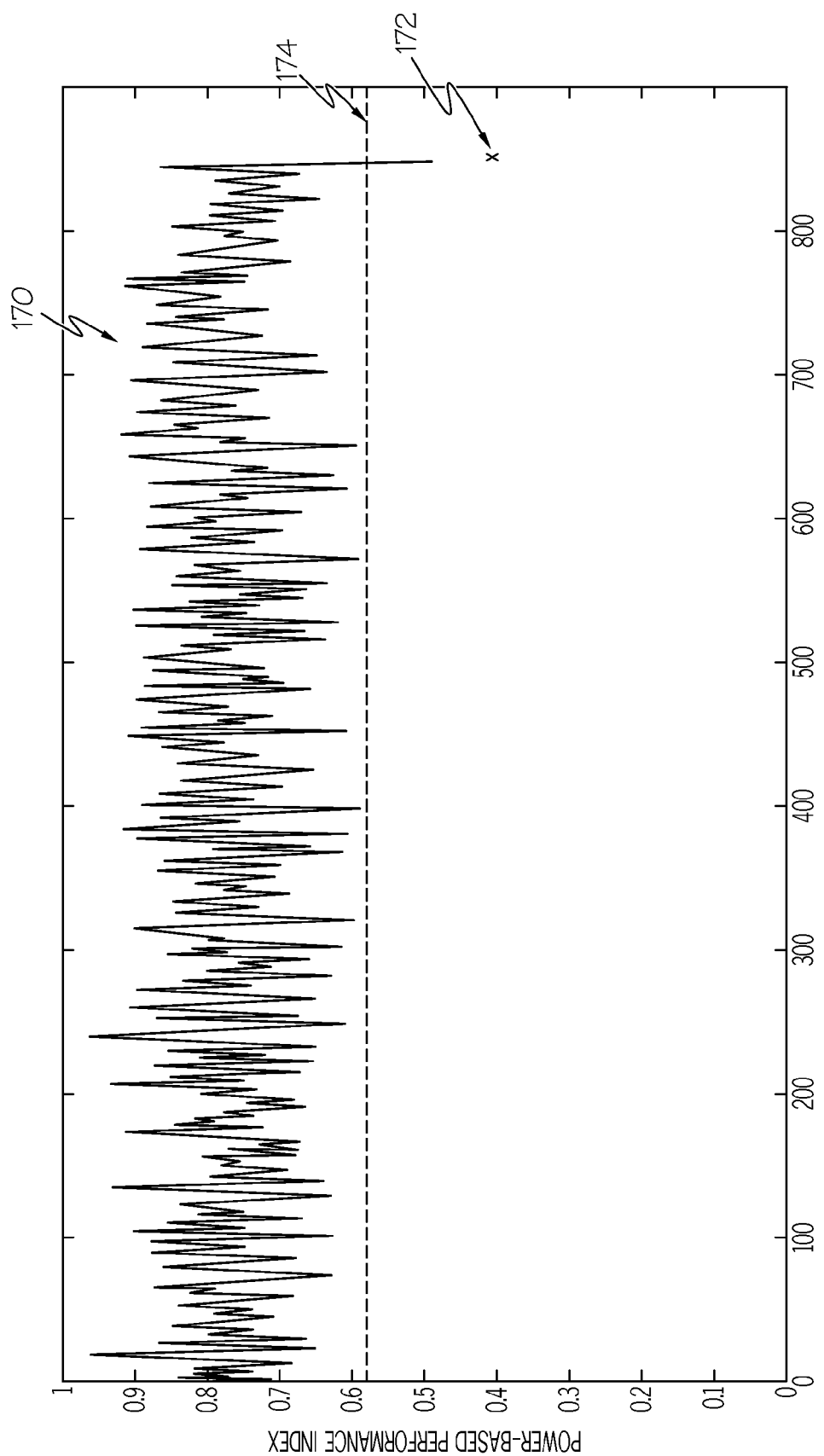
FIG. 8 graphically depicts power-based performance indexes over time according to one or more embodiments shown and described herein.

With reference to FIG. 8, a power-based performance index may be calculated per cycle using the mathematical procedures described herein. Predictive alarming may be utilized to provide indications of failures before they occur. For example, a predictive model may utilize a regression trend of historic power-based performance indexes 170 to predict a predicted power-based performance index 172 one cycle ahead. A statistical threshold 174 may be computed from the training data as described herein (e.g., FIG. 8 depicts a threshold that is three standard deviations below the mean). An alarm is raised when the predicted power-based performance index 172 falls below the statistical threshold.

Figure 9:
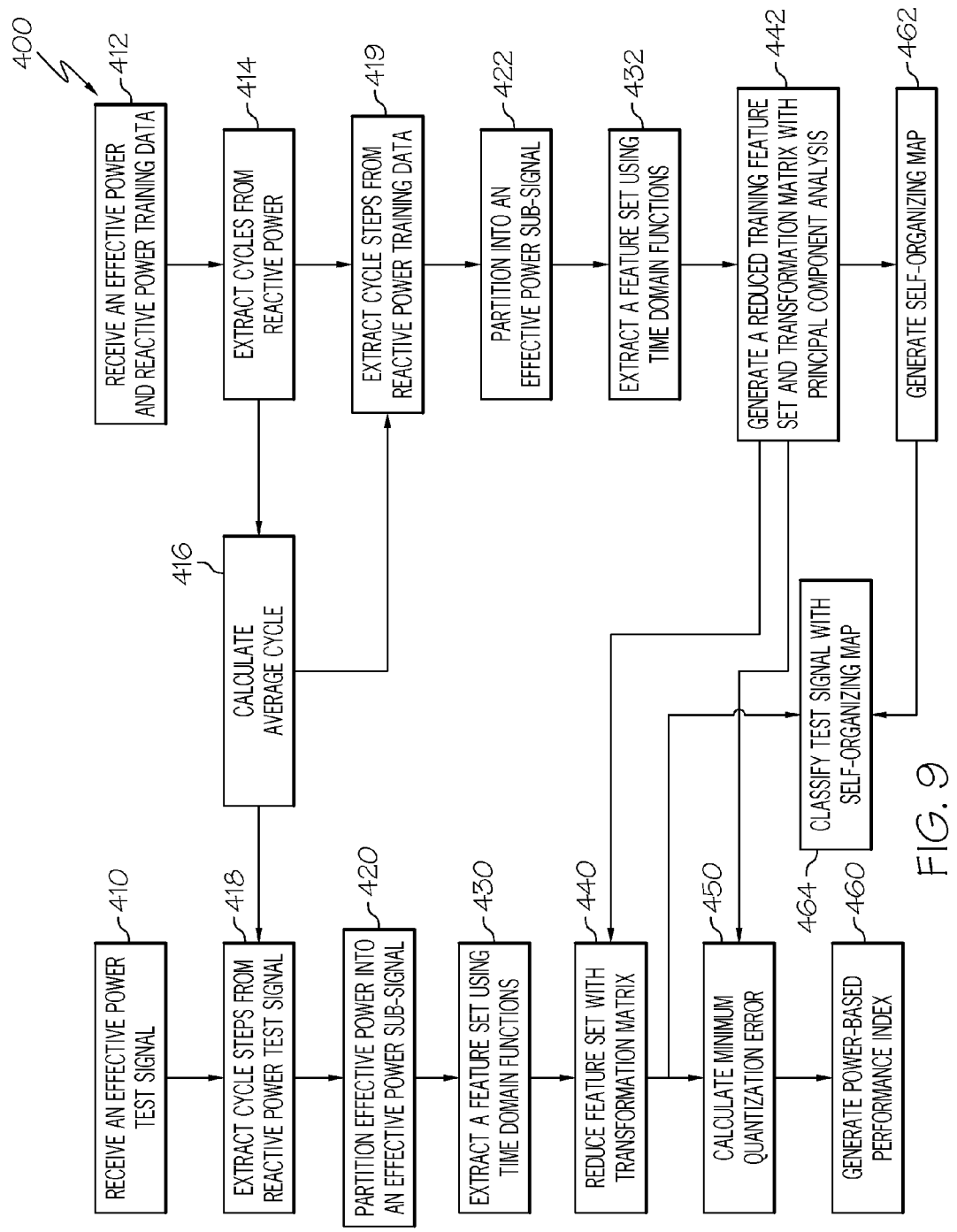
FIG. 9 depicts a flow chart of a method for managing an industrial process according to one or more embodiments shown and described herein.

A cycle may have intrinsic cycle information that is indicative of several independent and consecutive cycle steps executed during the cycle. For example, in a traditional injection molding process, a typical cycle includes several steps such as, for example, die closing, injection, rotation, die opening, ejection, and feed. The aforementioned models can be expanded to incorporate intrinsic cycle information (i.e. cycle steps) with the power-based performance indexes computed and analyzed per cycle step. Referring to FIG. 9, a further embodiment of a method 400 for managing an industrial process is depicted. The method 400 is similar to the method 300 and expands on the cycle extraction technique. An automated cycle step extraction, as is described above, extracts cycle step information to improve the resolution of the energy prognosis. An effective power training data and reactive power training data is received at process 412. Cycles are extracted from the reactive power training data at process 414. An average of the cycles is calculated at process 416. The cycle steps are extracted from the reactive power training data using an automated cycle step extraction technique at process 419. The effective power training data is partitioned into an effective power sub-signal according to the cycle steps in process 422. The effective power training data may be partitioned according to the cycle step information from the reactive power training data when the two data sets are synchronized. A feature set is extracted by applying time domain functions at a cycle step resolution to both the effective power training data and the reactive power training data at process 432. A reduced training feature set and a transformation matrix are generated with a principal component analysis at process 442. A collection of reduced training feature sets are utilized to generate a self-organizing map at process 463 according to supervised training, as is described in detail above.

At process 410, an effective power test signal and a reactive power test signal are received. Cycle steps are extracted from the reactive power test signal using the average cycle information from the training data and the automated cycle step extraction technique at process 418. It is noted that the use of average cycle information is for computational efficiency with relatively low impact on accuracy for repetitive processes. However, other embodiments may utilize the cycle extraction technique directly on test data when average cycle calculations lead to relatively high levels of inaccuracy. For test signals that are synchronized, the effective power test signal is partitioned according to the cycle steps of the reactive power test signal into an effective power sub-signal at process 420. A test feature set is extracted by applying time domain functions are applied at a cycle step resolution to both the effective power test sub-signal and the reactive power test sub-signal at process 430. The test feature set is reduced into a reduced test feature set with the transformation matrix from the principal component analysis at process 440. The reduced test feature set is input into the self-organizing map and classified, i.e., mapped as a hit point at process 464.

The reduced test feature set is also utilized with the reduced training feature sets to calculate minimum quantization error at process 450. The minimum quantization error is calculated to determine the distance the reduced test feature set is from its closest matching reduced training feature set. The distance measure is used for operation tracking and fault detection for each cycle step. In other embodiments, the self organizing map may be utilized to calculate the minimum quantization error, as is described in more detail above. The power-based performance index is indicative of the distance measure of the minimum quantization error. Therefore, the distance measure may be output as the power-based performance index at process 460. Historic power-based performance indexes may be input into a predictive model to predict a power-based performance index one cycle step into the future.

Figure 10:
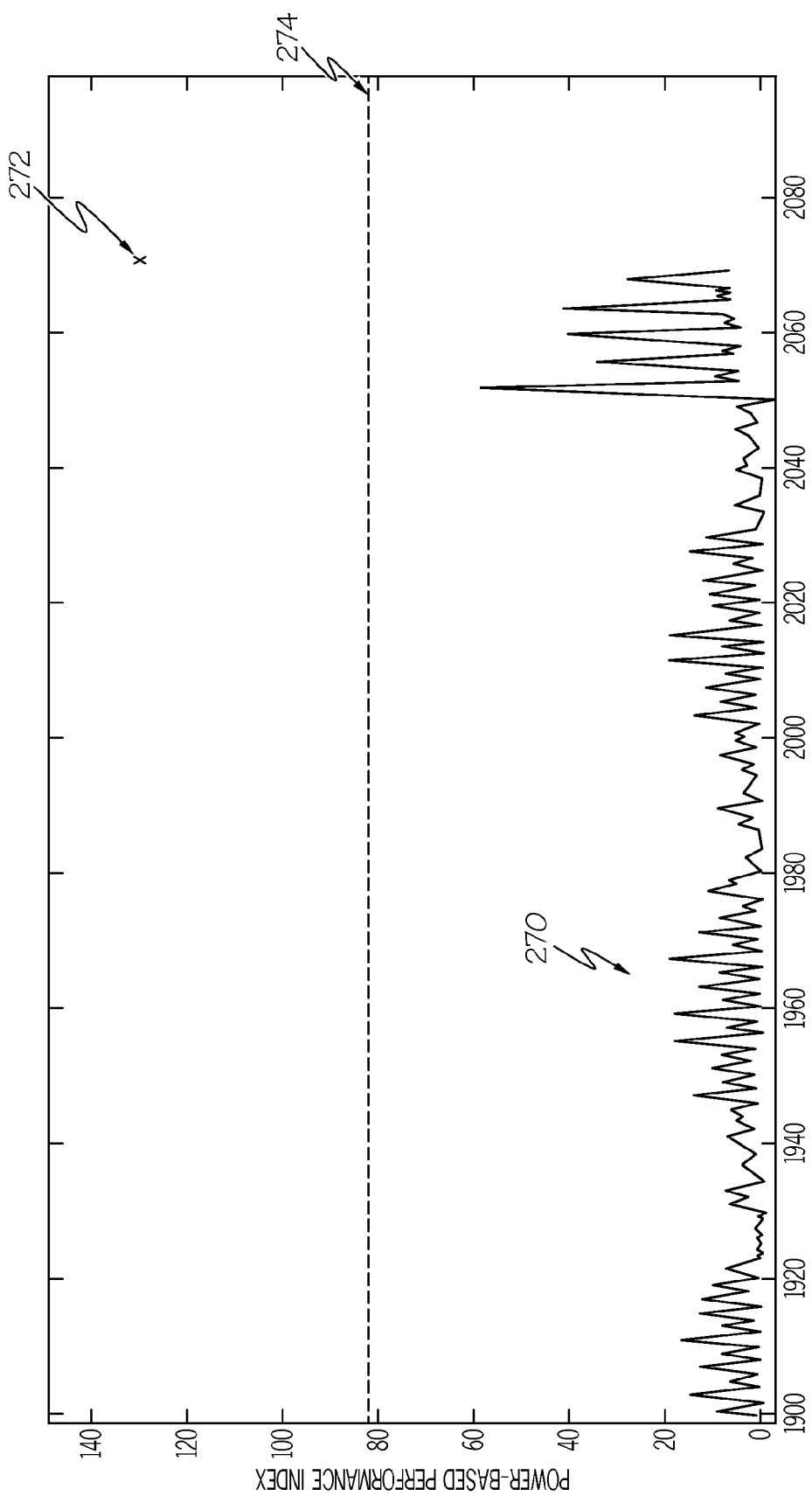
FIG. 10 graphically depicts power-based performance indexes over time according to one or more embodiments shown and described herein.

With reference to FIG. 10, a power-based performance index may be calculated per cycle using the mathematical procedures described herein. Predictive alarming may be utilized to provide indications of failures one cycle step before they occur. For example, a predictive model may utilize a regression trend of historic power-based performance indexes 270 to predict a predicted power-based performance index 272 one cycle step ahead. A statistical threshold 274 may be computed from the training data as described herein (e.g., FIG. 10 depicts a threshold that is three standard deviations above the maximum of the training data). An alarm is raised when the predicted power-based performance index 272 exceeds the statistical threshold.

Additionally, it is noted that the cycle step level analysis may be utilized to inferentially determine component level performance. For example, each cycle step of an injection molding process has an internal mechanical component that consumes electrical energy. Specifically, closing the die and injection uses an injection motor; rotation uses an injection motor; die open and ejection uses an ejection motor and a hydraulic pump; and material feed for next cycle uses a feed motor. Thus, when a cycle step is correlated to a step carried out by a single power consuming component, quantifying the power-based performance at the cycle step resolution reveals information about the component performance such as, for example, a motor, a pump, or any other component that consumes energy at cycle step increments.

In further embodiments, the energy prognosis may quantify the energy consumed throughout an industrial process by utilizing a cost based model. The cost based model generates an energy prognosis indicative of energy consumption and/or energy cost based upon partitioned energy related signals and/or production volume data. In one embodiment, the energy related signal is partitioned according to a time block, cycle, and/or cycle step. The cost based model analyzes the partitioned signal and generates an energy prognosis indicative of the amount of energy consumed per time block, per cycle, and/or per cycle step. The energy prognosis can be utilized to improve the efficiency of the manufacturing process by matching consumption to portions of the industrial process, for example, cycle step power consumption data may identify inefficient machine components. In another embodiment, production volume information is utilized to generate an energy prognosis indicative of the amount of energy consumed to per product, i.e., each product may be provided with a label (e.g., kW/product) which describes its production cost in terms of electrical energy consumed. For example, when an industrial process has a known fixed production volume, the amount of energy consumed per is determined by a ratio of the energy consumed per segment (i.e., time block, cycle, or cycle step) to the production volume per segment. Additionally, the energy prognosis may be extrapolated to describe the monetary cost (e.g., $/product) of the energy consumed by multiplying the energy consumption information (e.g., kW/product) with a known energy cost (e.g. $/kW).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for managing an industrial process wherein a processor transforms an energy related test signal into an energy prognosis, the method comprising:

receiving automatically with the processor the energy related test signal comprising effective power test data indicative of electrical energy consumed by an energy consuming machine;

partitioning automatically with the processor the energy related test signal into an energy related test sub-signal;

applying automatically with the processor mathematical functions to the energy related test sub-signal to extract a feature set of data from the energy related test sub-signal;

transforming automatically with the processor the feature set of data with a transformation matrix into a reduced test feature set;

inputting automatically with the processor the reduced test feature set into a performance assessment algorithm, wherein the performance assessment algorithm is based at least in part upon a reduced training feature set derived from data indicative of electrical energy consumed during healthy operation; and generating automatically with the processor the energy prognosis, wherein the energy prognosis is based at least in part upon a power-based performance index calculated by the performance assessment algorithm.

2. The method for managing an industrial process of claim 1 further comprising calculating automatically with the processor a difference between the power-based performance index and a prior-consecutive power-based performance index, and generating automatically with the processor a fault indication when the difference exceeds a threshold.

3. The method for managing an industrial process of claim 1 further comprising:

inputting automatically with the processor the power-based performance index into a performance prediction algorithm, wherein the performance prediction algorithm is trained with a set of historic power-based performance indexes;

predicting automatically with the processor a future performance index with the performance prediction algorithm, wherein the future performance index is based at least in part upon the power-based performance index; and generating automatically with the processor a fault indication when the future performance index exceeds a threshold.

4. The method for managing an industrial process of claim 1 further comprising providing a user interface automatically with the processor to receive a time block wherein the energy related test sub-signal is partitioned according to the time block.

5. The method for managing an industrial process of claim 1 further comprising:

providing reactive power training data indicative of electrical energy consumed during healthy operation;

locating automatically with the processor a first peak within the reactive power training data;

identifying automatically with the processor a first subsequent near-zero within the reactive power training data that is nearest to the first peak wherein, the first subsequent near-zero occurs after the first peak;

locating automatically with the processor a second peak within the reactive power training data wherein, the second peak occurs after the first peak;

identifying automatically with the processor a second subsequent near-zero within the reactive power training data that is nearest to the second peak wherein, the first subsequent near-zero occurs after the first peak; and calculating automatically with the processor a cycle length based at least in part upon the first subsequent near-zero and the second subsequent near-zero.

6. The method for managing an industrial process of claim 5 further comprising calculating automatically with the processor an average cycle length of the reactive power training data, wherein the energy related test sub-signal is partitioned according to the average cycle length.

7. The method for managing an industrial process of claim 5 wherein the energy related test signal comprises reactive power test data, further comprising:
  associating automatically with the processor the cycle length with the reactive power test data indicative of electrical energy consumed by the energy consuming machine, wherein the cycle length is associated with a start point corresponding to a beginning of an industrial-machine cycle;
  extracting automatically with the processor a cycle step from the reactive power test data, wherein the cycle step is based at least in part upon the start point and a subsequent minimum within the reactive power test data that occurs after the start point; and
  associating the cycle step with the effective power test data.

8. The method for managing an industrial process of claim 1 further comprising:
  providing real power training data indicative of electrical energy consumed during healthy operation;
  applying automatically with the processor the mathematical functions to the real power training data to extract a training feature set of data from the real power training data; and
  transforming automatically with the processor the training feature set of data with a dimensionality reduction algorithm into the reduced training feature set, wherein the transformation matrix is defined by the dimensionality reduction algorithm.

9. The method for managing an industrial process of claim 1 further comprising calculating automatically with the processor a statistical overlap of the reduced training feature set and the reduced test feature set with a statistical pattern recognition algorithm, wherein the performance assessment algorithm comprises the statistical pattern recognition algorithm and the power-based performance index is indicative of the statistical overlap of the reduced training feature set and the reduced test feature set.

10. The method for managing an industrial process of claim 1 further comprising:
  training automatically with the processor a self-organizing map with the reduced training feature set;
  inputting automatically with the processor the reduced test feature set into the self-organizing map;
  mapping automatically with the processor the reduced test feature set to a location in the self-organizing map that best correlates to the reduced test feature set.

11. The method for managing an industrial process of claim 10 further comprising calculating automatically with the processor a distance measure indicative of a comparison of the location in the self-organizing map and the reduced test feature set.

12. The method for managing an industrial process of claim 1 wherein the energy prognosis is indicative of an amount of energy consumed to per product.

13. The method for managing an industrial process of claim 1 wherein the energy prognosis is an indication of a statistically significant delta between an immediately prior power-based performance index and the power-based performance index, an alarm when the power-based performance index exceeds a first threshold or a prediction that a future power-based performance index will exceed a second threshold based at least in part upon the power-based performance index.

14. The method for managing an industrial process of claim 1 wherein the energy related test signal further comprises data indicative of temperature, humidity, pressure, voltage, or current.

15. The method for managing an industrial process of claim 1 wherein the mathematical functions comprise a time domain function applied to a time block, a cycle or a cycle step.

16. An energy management system comprising:
  an energy consuming machine for producing a product;
  an energy sensor communicably coupled to the energy consuming machine wherein the energy sensor generates an energy related test signal comprising real power test data and reactive power test data indicative of energy consumed by the energy consuming machine;
  a processor communicably coupled to the energy sensor, wherein the processor executes machine readable instructions to:
    receive the energy related test signal;
    partition the energy related test signal into an energy related test sub-signal;
    apply time domain functions and/or frequency domain functions to the energy related test sub-signal to extract a feature set of data from the energy related test sub-signal;
    transform the feature set of data with a principle component analysis into a reduced test feature set;
    compare the reduced test feature set to training data indicative of a normal operating condition of the energy consuming machine;
    generate a power-based performance index with a performance assessment algorithm, wherein the power-based performance index is based at least in part upon a difference between the reduced test feature set and the training data; and
    generate a fault indication based at least in part upon the power-based performance index.

17. The energy management system of claim 16 wherein the processor executes the machine readable instructions to:
  extract a cycle step from the reactive power test data;
  associate the cycle step with the real power test data; and
  generate a component level performance prediction related to health of a component of the energy consuming machine.

18. The energy management system of claim 16 wherein the energy consuming machine is a milling machine, a pressing machine, an injection molding machine or a grinding machine.

19. The energy management system of claim 16 wherein the energy sensor is a temperature sensor, a humidity sensor, a pressure sensor, a current sensor, a voltage sensor, a power sensor, or an output from a controller.

20. A toolkit for managing an industrial process, wherein the toolkit is stored on a machine readable medium and comprises machine readable instructions to transform an energy related test signal into an energy prognosis, the machine readable instructions comprising:
  a signal loading algorithm to receive the energy related test signal comprising real power test data indicative of electrical energy consumed by an energy consuming machine;
  a partitioning algorithm to transform the energy related test signal into an energy related test sub-signal;

a feature extraction algorithm to transform the energy related test sub-signal into a feature set of data from the energy related test sub-signal;

a dimensionality reduction algorithm to transform the feature set of data into a reduced test feature set;

a performance assessment algorithm for comparing the reduced test feature set to a baseline indicative of a normal operating condition of the energy consuming machine;

a performance prediction algorithm for generating the energy prognosis that forecasts a future health condition of the energy consuming machine based at least in part upon the reduced test feature set; and a visualization algorithm for displaying the energy prognosis.

* * * * *